(12) United States Patent
Kobayashi

(10) Patent No.: US 11,087,159 B2
(45) Date of Patent: Aug. 10, 2021

(54) OBJECT DETECTION DEVICE, OBJECT DETECTION METHOD AND NON-TRANSITORY COMPUTER READABLE MEDIUM

(71) Applicant: Preferred Networks, Inc., Tokyo (JP)

(72) Inventor: Sosuke Kobayashi, Tokyo (JP)

(73) Assignee: PREFERRED NETWORKS, INC., Tokyo (JP)

(*) Notice: Subject to any disclaimer, the term of this patent is extended or adjusted under 35 U.S.C. 154(b) by 135 days.

(21) Appl. No.: 16/192,624

(22) Filed: Nov. 15, 2018

(65) Prior Publication Data
US 2019/0147285 A1    May 16, 2019

(30) Foreign Application Priority Data
Nov. 16, 2017 (JP) ............... JP2017-221079

(51) Int. Cl.
*G06K 9/00* (2006.01)
*G06K 9/32* (2006.01)
*G06T 7/73* (2017.01)
*G06T 7/12* (2017.01)

(52) U.S. Cl.
CPC ........ *G06K 9/3241* (2013.01); *G06T 7/12* (2017.01); *G06T 7/75* (2017.01); *G06T 2207/20081* (2013.01)

(58) Field of Classification Search
CPC ......... G06K 2009/3225; G06K 9/3233; G06K 9/3241; G06K 9/325; G06K 2009/3291; G06K 9/34; G06K 9/342; G06K 9/346; G06K 9/36; G06K 9/46; G06T 7/12; G06T 7/75; G06T 2207/20081
See application file for complete search history.

(56) References Cited

U.S. PATENT DOCUMENTS

2018/0114084 A1* 4/2018 Meng ............... G06K 9/3233
2018/0286077 A1* 10/2018 Ikeda ................... G06T 7/77

OTHER PUBLICATIONS

Wei Liu et al., "SSD: Single Shot MultiBox Detector", European Conference on Computer Vision, ECCV 2016: Computer Vision—ECCV 2016 pp. 21-37, Sep. 17, 2016.
Navaneeth Bodla et al., "Improving Object Detection With One Line of Code", arXiv, pp. 1-9, Aug. 8, 2017.
Jun Hatori et al., "Interactively Picking Real-World Objects with Unconstrained Spoken Language Instructions", arXiv, pp. 1-8, Mar. 28, 2018.

* cited by examiner

*Primary Examiner* — Huy C Ho
(74) *Attorney, Agent, or Firm* — Foley & Lardner LLP

(57) ABSTRACT

An object detection device includes a memory that stores data, and processing circuitry coupled to the memory. The processing circuitry is configured to set an object point indicating a position of an object in image data, detect a candidate region that is a candidate for an object region where the object in the image data exists, select the candidate region having the object point as an object region, and output the selected candidate region as the object region where the object exists.

22 Claims, 5 Drawing Sheets

OBJECT DETECTION DEVICE, OBJECT DETECTION METHOD AND NON-TRANSITORY COMPUTER READABLE MEDIUM

CROSS-REFERENCE TO RELATED APPLICATIONS

This application claims the benefit of and priority to Japanese Patent Application No. 2017-221079, filed on Nov. 16, 2017, the entire contents of which are incorporated herein by reference.

FIELD

Embodiments described herein relate to an object detection device, an object detection method and a non-transitory computer readable medium.

BACKGROUND

As a method of detecting a region or the like where an object in an image exists, a plurality of candidate regions with scores may be output, a plurality of candidate regions may be selected in order from the one having a high score, a candidate region determined to indicate the same object as an object indicated by the already selected candidate region may be deleted, and the process may be repeated until there are no unselected candidate regions.

However, for example, since candidates with a high overlapping degree of candidate regions are deleted, there is a restriction that candidate regions with a large overlapping degree of candidate regions are not detected. Specifically, when there is an overlap between objects in the image, there is a problem in detecting appropriately overlapping objects.

DETAILED DESCRIPTION

According to some embodiments, an object detection device includes a memory that stores data, and processing circuitry coupled to the memory and configured to set an object point that is a point indicating a position of an object in image data, detect a candidate region that is a candidate for a region where an object in the image data exists, select the candidate region having one object point as an object region, and output the selected object region as a region where an object exists.

In some embodiments, a marker, a barcode, or the like is attached in advance to an object, an object point which is a point representing an object is set by detection of the marker, barcode, or the like with respect to a photographed image, while a candidate region where an object is estimated to exist is separately detected, and it is attempted to detect a region where an object exists based on this object point and candidate region. Hereinafter, an object detection device according to some embodiments will be described in detail with reference to the drawings. In the following description of the embodiment, what is called an object may include a human or another organism.

Figure 1:
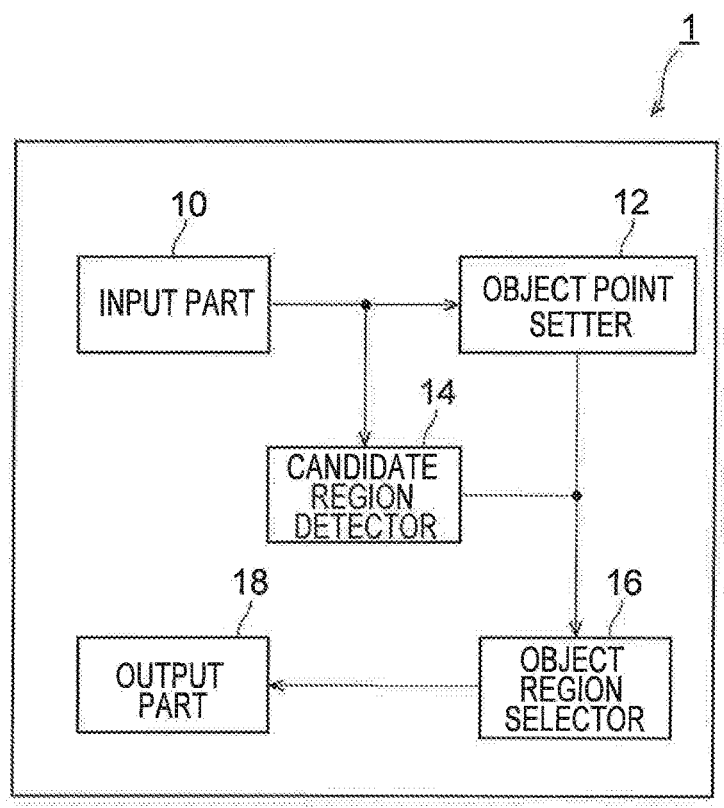
FIG. 1 is a block diagram showing functions of an object detection device according to some embodiments.

FIG. 1 is a block diagram showing functions of an object detection device 1 according to some embodiments. The object detection device 1 includes an input part 10, an object point setter 12, a candidate region detector 14, an object region selector 16, and an output part 18.

The input part 10 is an interface through which image data is input from outside. For example, an image photographed by a camera, an image input by a user, or data related to an image such as a database or the like is input to the input part 10. This image may be a still image or a moving image. When a moving image is input, the input part 10 may appropriately convert each frame into a still image, or convert only the specified frame into a still image. In addition, the input part 10 may have a user interface and accept instructions or requests from a user. For example, a parameter or the like used for detection may be changed by a user.

At least one or more of the input part 10, the object point setter 12, the candidate region detector 14, the object region selector 16, and the output part 18 may be implemented with a special circuit (e.g., circuitry of a FPGA or the like), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like.

Figure 2:
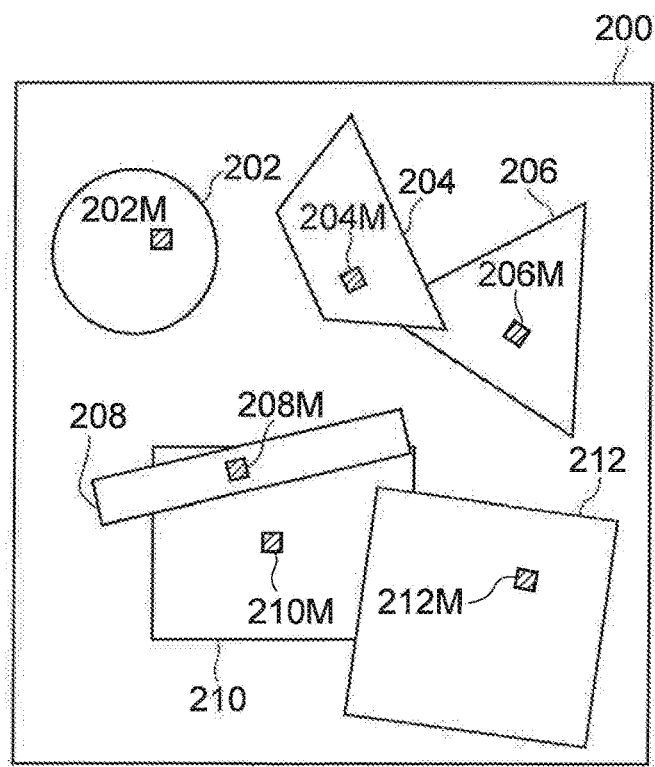
FIG. 2 shows an example of an input image.

FIG. 2 shows an example of an image 200 to be input. Graphics, such as a circle, a rectangle, and a triangle in the figure may be objects photographed in the image. That is, six objects of objects 202, 204, 206, 208, 210, and 212 are photographed in the image 200. In each object, hatched rectangles are markers 202M, 204M, 206M, 208M, 210M, and 212M attached to the respective objects.

The object point setter 12 may set an object point which is a point indicating an object in the image 200. In the image 200 of FIG. 2, for example, the object point of the object 202 is detected and set as the marker 202M. Similarly, the object points of the objects 202, 204, . . . , 212 are detected and set as the markers 202M, 204M, . . . , 212M, respectively.

The marker may be, for example, a region painted with a predetermined color or a region in which a predetermined graphic is drawn. As another example, a barcode or a two-dimensional barcode may be attached to an object. In this manner, with respect to an object to which a marker is attached, it is possible to easily detect an object point by photographing an image with a device, such as a camera.

As still another example, something that is difficult to visually observe, such as an IC chip, may be attached to an object in advance, and an object point may be set by detection of information of the IC chip. In the case of using an IC chip, the position of the IC chip may be detected at the same timing as photographing of an image by using, in addition to a camera that photographs the image, a device that transmits and receives radio waves and estimates the position. Then, by superimposing these data, the IC chip may be set as an object point in the image.

The candidate region detector 14 may estimate a region where an object exists in an image and detects the estimated region as a candidate region. The estimation of a region where an object exists may use any algorithm as long as it is an appropriate algorithm for estimating an existence region of an object.

For example, the estimation may be performed by detecting edges in the image 200 and tracking the edges, or may be performed based on color or saturation information or the like in a partial image of a predetermined size. As another method, a desired object image may be read in advance at various angles and matched filter processing such as cross-correlation calculation or the like may be performed, or a model generated by supervised learning may be used for estimation.

Figure 3:
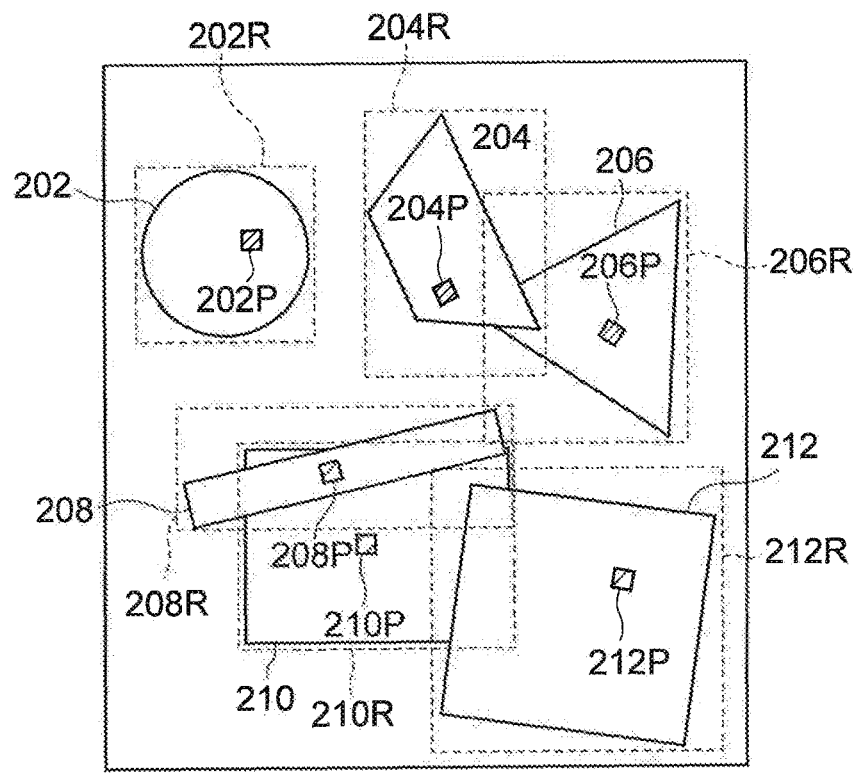
FIG. 3 shows an example of extraction of a candidate region according to some embodiments.

FIG. 3 is a diagram showing one example of detecting a candidate region. For example, for the object 202, a candidate region 202R may be detected as a region where the object 202 is estimated to exist. Likewise, candidate regions 204R, 206R, 208R, 210R, and 212R are detected for objects 204, 206, 208, 210, and 212, respectively. In this manner, the candidate region may be detected so as to surround the region where the object is estimated to exist.

Figure 4:
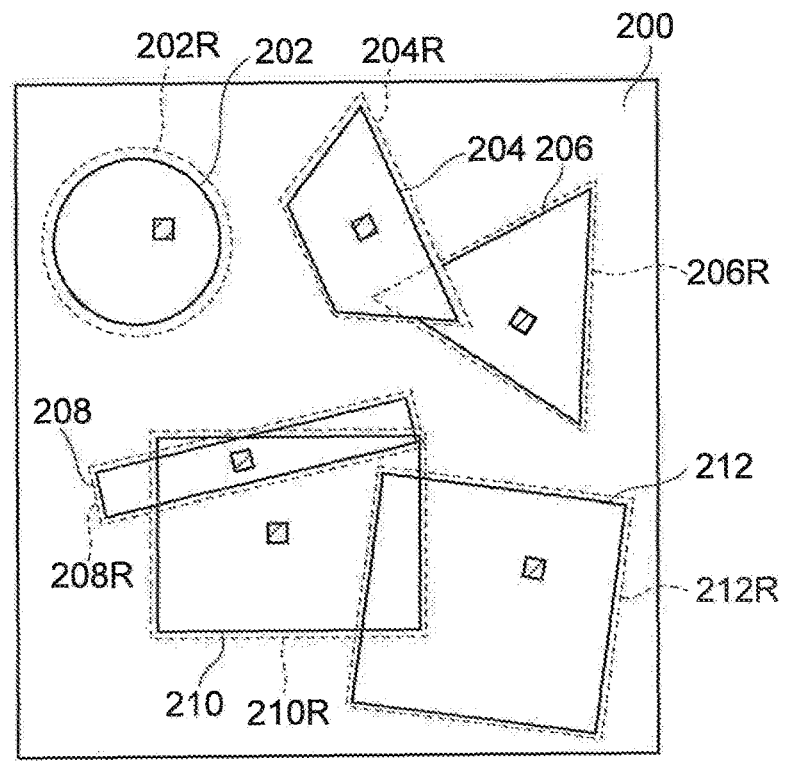
FIG. 4 shows another example of extraction of a candidate region according to some embodiments.

FIG. 4 is a diagram showing another example of detecting a candidate region. All regions need not be rectangular as shown in FIG. 3, and candidate regions may be detected with a shape considered as an object. Even rectangles are not necessarily rectangles that are parallel to the horizontal axis and the vertical axis of the image 200, as in the candidate regions 208R and 212R, and may be detected as rectangles having an inclination with respect to the image 200. Furthermore, the candidate region need not be the one that accurately traces the outer periphery of the object, as shown in FIG. 4. In this way, the candidate region may be any region as long as it can appropriately detect a region where the object is estimated to exist (e.g., a region surrounding or covering the region where the object may be determined to exist based on a result of estimation).

Returning to FIG. 1, based on the object point set by the object point setter 12 and the candidate region detected by the candidate region detector 14, the object region selector 16 may select an object region which is a region where the object exists.

The output part 18 may output the object region selected by the object region selector 16. For outputting, for example, the object region may be output as an image, or the coordinates related to the object region may be output. Further, as the output destination, output may be made to a program or the like and furthermore some operation may be performed, or output may be displayed on the display so that the user can visually observe it.

Figure 5:
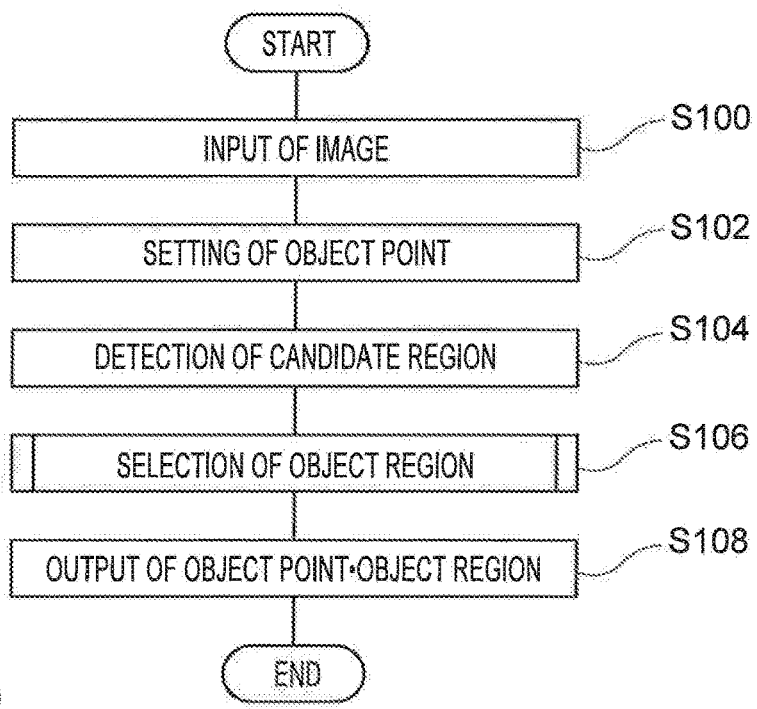
FIG. 5 is a flowchart showing a process according to some embodiments.

FIG. 5 is a flowchart showing a processing flow of the object detection device 1 according to some embodiments.

First, the input part 10 may accept an input of an image from which an object existence region is desired to be extracted (step S100). As described above, the image may be directly input from an imaging device, such as a camera, or may be input by the user designating a file.

Next, the object point setter 12 may set an object point (step S102). When the marker 202M or the like is attached to the object as an object point as shown in FIG. 2, for example, the object point setter 12 may set the center point of this marker as the object point.

As another example, the image may be input to a first model for extracting an object point, and an object point may be set to each object. This first model may be a model optimized by learning (for example, supervised learning) in advance. This model obtained by learning may be, for example, a model, such as a neural network. Furthermore, in some embodiments, learning may not be performed, and a linear matching model or a model that calculates cross-correlation for each region may be used.

Next, the candidate region detector 14 may detect a candidate region which is a candidate region where an object exists (step S104). As shown in FIG. 3 or FIG. 4, the candidate region can be detected in an arbitrary shape (e.g., a rectangle, a triangle, a circle, a trapezoid, etc.). As described above, this detection may be performed by edge detection, matching, computation using a learned model, or the like.

The detection of the candidate region may also be performed in the same manner as the extraction of the object point. That is, the image may be input to a second model for detecting the candidate region, and the region where the object is estimated to exist may be detected as the candidate region. Like the first model, this second model may also be a model optimized by learning in advance (for example, supervised learning or neural network) or may be another linear model or the like (e.g., a model that calculates cross-correlation for each region).

FIG. 5 illustrates a process of setting the object point of the object point setter 12 and a process of detecting the candidate region of the candidate region detector 14. According to the processes, first, the object point may be set and then the candidate region may be detected, but the processes are not limited to this. That is, these processes may be performed in reverse order, or may be executed at the same timing using parallel processing.

Next, the object region selector 16 may select an object region where the object exists from the candidate region (step S106). Details of this subroutine will be described later.

Next, the output part 18 may output the object region for each object selected by the object region selector 16 (step S108). At this time, the object point set by the object point setter 12 may be output in association with the corresponding object region.

Figure 6:
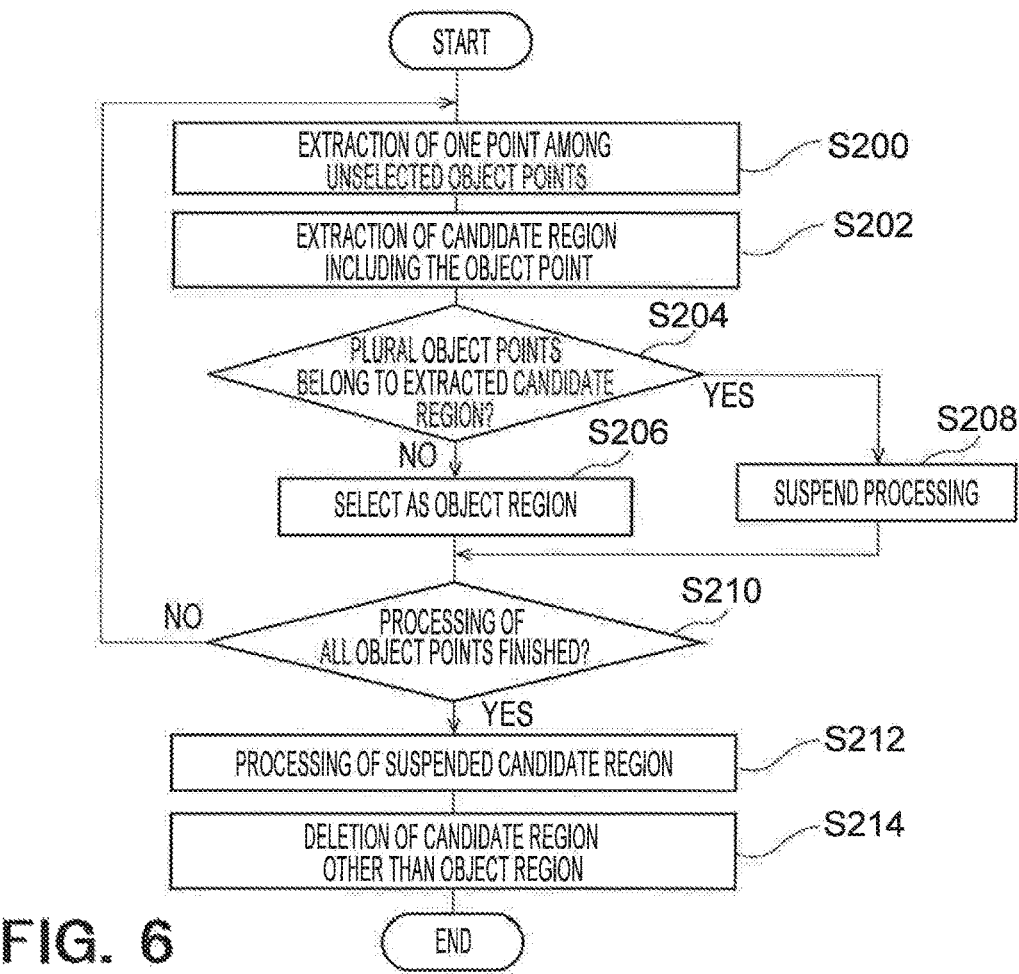
FIG. 6 is a flowchart showing a process of selecting an object region according to some embodiments.

FIG. 6 is a flowchart showing a process related to step S106 in FIG. 5. The object region selector 16 may select an object region from the object point and the candidate region according to the following process. For example, there are two approaches to this process depending on whether to focus on the object point or to focus on the candidate region. First, a method focusing on object points will be described.

First, one object point out of unselected object points may be extracted (step S200). If there are a plurality of object points, extraction of object points from among the plurality of object points may be performed in any order. Here, the unselected object points indicate object points that have not yet been subjected to the process after step S202.

Next, a candidate region including the extracted object point may be extracted (step S202). The number of candidate regions to be extracted may be one or plural. For example, when the candidate region is a rectangle as shown in FIG. 3, this process may be performed by extracting the coordinates of a point on a diagonal line of (a rectangle of) each candidate region and extracting an object point existing between the horizontal and vertical coordinates of the diagonal line. For example, an object point whose horizontal coordinate lies in a range of the horizontal coordinates of the diagonal line and whose vertical coordinate lies in a range of the vertical coordinates of the diagonal line, may be extract. When the candidate region is not a rectangle, for example, labeling within a candidate region may be performed, and an object point within the labeled region may be extracted. For example, a candidate region may be divided into a plurality of labeled regions, and an object point within each of the labeled regions may be extracted. The above is just an example, and any process may be performed as long as it is a process that can appropriately extract points within the range.

Next, it is determined whether or not a plurality of object points belong to the extracted candidate region (step S204). When the extracted candidate region (extracted in S202) has the extracted object points (extracted in S200) in the region and does not have any other object point (step S204: NO), the candidate region is selected as the object region (step S206).

On the other hand, if a plurality of object points exist in the extracted candidate region (step S204: YES), the process related to the candidate region is suspended and the next process is performed (step S208).

In some embodiments, when a plurality of candidate regions are extracted with respect to an object point, at the time when the candidate region on which the processing in step S206 has been performed exist, another candidate region may be deleted from the candidate of the object region for the object point. In this manner, the processing from step S204 to step S208 may be performed in a plurality of candidate regions until a candidate region including one object point is extracted.

In some embodiments, all the candidate regions extracted in step S202 may be scored according to an inclusion degree of the object point (for example, a distance between a center point of a candidate region and an object point; see the description below with reference to FIG. 7), and after the processing from step S204 to step S208 is performed, the candidate region with the highest score may be selected as the object region for the object point. In this case, among the extracted candidate regions, the suspended candidate region, for example, may be scored lowest in scoring so as not to be selected, or the suspended candidate region may not be selected as an object region at this stage.

Thus, the processing from step S204 to step S208 is not limited to the flowchart shown in the figure, but it is determined whether there are a plurality of object points in the candidate region, if there is only one object point, the candidate region is selected as the object region, and otherwise the processing may be performed so as to suspend the candidate region.

Whether or not the processing from step S200 to step S208 has been performed on all object points may be determined (step S210). If there is an object point on which the processing has not been performed yet (step S210: NO), the processing from step S200 to step S208 is performed on an object point on which the processing has not been performed.

On the other hand, if the processing from step S200 to step S208 has been completed for all the object points (step S210: YES), the processing of the suspended candidate region (suspended in S208) is performed (step S212). If there is a candidate region where the processing is suspended in step 208, it is determined whether or not the suspended candidate region is an object region.

In some embodiments, if there exist no object points for which an object region cannot be selected among a plurality of object points in the suspended candidate region, it may be determined that the suspended candidate region is not an object region, and the suspension may be released and the candidate region may be deleted from a list of the candidates of the object region.

When there exists one object point for which the object region cannot be selected among the plurality of object points in the candidate region, it may be determined that the suspended candidate region is an object region, and the suspension may be released and the candidate region may be selected as the object region corresponding to the object point.

If it is not the case above and an object region cannot be selected at a plurality of object points, for example, the candidate region that is closest, among the plurality of candidate regions, to a center of the object region or a weighted centroid point of the object region, may be selected as an object region corresponding to an object point. This is only an example, and an object region corresponding to an object point may be selected by another method. As another example, in such a case, it may be output that the object region corresponding to the object point could not be detected.

Next, the output part 18 may output the object region selected by the object region selector 16 (step S214). The number of object regions to be output may be the same as the number of object points, or may be smaller than the number of object points. As described above, the object region may be output in association with the object point.

Each of the steps (in FIG. 5 and FIG. 6) described above may be performed particularly by a special circuit (e.g., circuitry of a FPGA or the like), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like, in input part 10, the object setter 12, the candidate region detector, the object region selector 16, or the output part 18 (see FIG. 1). For example, an object point selector, a candidate region extractor, an object region determiner, an object region detector, a candidate region suspending part, a suspended candidate region processing part, and a candidate region deleting part, which are not shown, may perform processing in step S200, step S202, step S204, step S206, step S208, step S212, and step S214, respectively, using a special circuit, or a program stored in memory and executable by a processor.

The selection process of the object region will be specifically described with reference to FIG. 3. In FIG. 3, it is assumed that the hatched point is an object point in each object.

Since one object point 202P exists and no other object points exist in the candidate region 202R of the object 202, the candidate region 202R may be selected as the object region corresponding to the object point 202P.

Although the object 204 partially overlaps the object 206, the candidate region including the object point 204P may be the candidate region 204R, and the candidate region including the object point 206P may be the candidate region 206R. Because only one object point belongs to the candidate region 204R, and only one object point belongs to the candidate region 206P, the candidate region 204R may be selected as the object region of the object 204, and the candidate region 206R may be selected as the object region of the object 206. In a similar manner, the candidate region 212R may be selected as the object region of the object 212 because only one object point (i.e., the object point 212P) belongs to the candidate region 212R.

In the case of the object 208 and the object 210, the object point 208P of the object 208 exists in the candidate region 210R of the object 210. That is, in this case, two object points of the object point 208P and the object point 210P exist in the candidate region 210R. Details of object region extraction will be described below using the object point 208P and the object point 210P as an example.

(First Case of Object Region Extraction)

First, a case where processing is performed in the order of the object point 208P and the object point 210P will be described. Processing on other object points may be performed between times of the processing on these two object points. For example, the processing of the object point 208P, the object point 206P, and the object point 210P may be performed in this order. That is, the processing of the object point 208P and the processing of the object point 210P are not necessarily performed in succession. As the candidate region having the object point 208P, two candidate regions 208R and 210R are extracted (step S202). Among these two regions, in the candidate region 208R, one object point of the object point 208P exists, and in the candidate region 210R, two object points of the object point 208P and the object point 210P exist (step S204).

Since when the number of object points are determined from the candidate region 208R, only the object point 208P exists in the candidate region 208R (step S204: NO), for example, the candidate region 208R may be selected as the object region corresponding to the object point 208P (step S206), and the other candidate region, that is, the candidate region 210R may be deleted from the candidate corresponding to the object point 208P. Therefore, only the candidate region 208R can be selected as the object region corresponding to the object point 208P.

When processing is performed first from the candidate region 210R, two object points 208P and 210P exist in the candidate region 210R (step S204: YES), and thus the processing of the candidate region 210R for the object point 208P may be suspended (step S208). Thereafter, as in the above case, the candidate region 208R may be selected as the object region corresponding to the object point 208P (step S206), and thus the candidate region 210R may be deleted from the candidate region corresponding to the object point 208P (step S212).

Next, processing may be performed on the object point 210P (step S200). As the candidate region including the object point 210P, the candidate region 210R exists (step S202). Then, two points of the object points 208P and 210P exist in the candidate region 210R (step S204: YES). Therefore, the processing for the candidate region 210R is suspended once (step S208). However, since the candidate region 210R has already been deleted from the candidate region corresponding to the object point 208P, as a result, only one point (i.e., the object point 210P) without the object point 208P exists as the object point in the candidate region 210R.

That is, in this case, the candidate region 210R may be selected as the object region corresponding to the object point 210P (step S212). Since the candidate region 210R is deleted from the candidate region for the object point 208P, it may be determined in step S204 that the object point possessed by the candidate region 210R is 210P. As a result, without suspending the process, and the process may proceed to step S206.

(Second Case of Object Region Extraction)

The case where the object point 210P and the object point 208P are processed in this order will be described. As the candidate region having the object point 210P, the candidate region 210R may be extracted (step S202). Since two object points 208P and 210P exist in the candidate region 210R (step S204: YES), the processing of the candidate region 210R for the selection of the object region corresponding to the object point 210P may be suspended (step S208).

Next, processing is performed on the object point 208P (step S200). As the candidate region including the object point 208P, two regions of the candidate region 208R and the candidate region 210R may be extracted (step S202). When processing is performed in the order of the candidate regions 208R and 210R, since one point of the object point 208P exists in the candidate region 208R (step S204: NO), the candidate region 208R may be selected as the object region corresponding to the object point 208P (step S206), the candidate region 210R may be deleted from the candidate of the object point 208P, and the same processing as described above may be performed.

When processing is performed in the order of the candidate regions 210R and 208R, since two object points 208P and 210P exist in the candidate region 210R (step S204: YES), the processing of the object point 210P may be suspended (step S208). Thereafter, since the candidate region 208R is processed and one point of the object point 208P exists in the candidate region 208R (step S204: NO), the candidate region 208R may be selected as the object region corresponding to the object point 208P (step S206), and the subsequent processing may be the same as that described above.

In this way, when there exists a candidate region including two object points, temporarily suspending the processing can make it possible to appropriately select one object region viewed from the object point.

(Third Case of Object Region Extraction)

Figure 7:
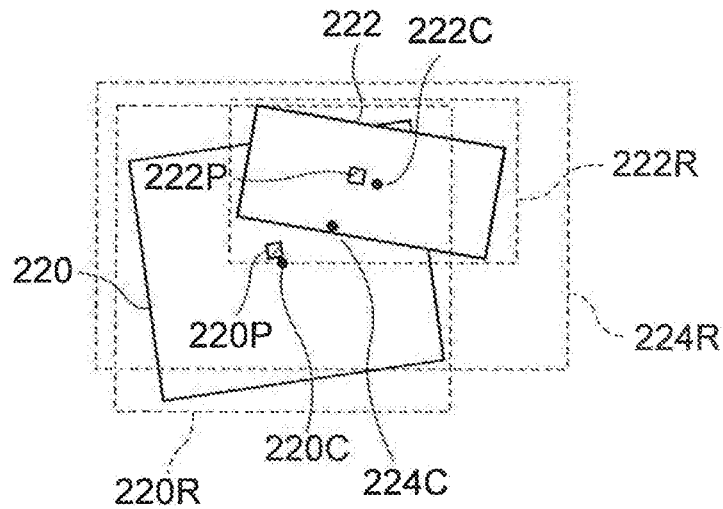
FIG. 7 shows an example of arrangement of objects in an input image.

FIG. 7 is a diagram showing another example. The drawing shown in FIG. 7 may be obtained by cutting out a part of the image 200, and for example, an object 220 and an object 222 may be photographed. In this example, an object point 220P and an object point 222P are set as object points, a candidate region 220R and a candidate region 222R are detected as candidate regions, and a candidate region 224R is further detected as another candidate region.

Processing in the case of FIG. 7 will be described according to the flowchart of FIG. 6.

First, for example, the object point 220P may be extracted as an unselected object point (step S200). Next, the three candidate regions 220R, 222R, and 224R may be extracted as candidate regions including the object point 220P (step S202). Processing from step S204 to step S208 may be performed on each of the extracted three regions.

Since the candidate region 220R includes the object points 220P and 222P (step S204: YES), the processing may be suspended (step S208). Likewise for the other two candidate regions 222R and 224R, since the object points 220P and 222P are included therein, the processing may be suspended for both of them.

Next, processing of the suspended candidate region may be performed (step S212). In the case of the objects 220 and 222 in FIG. 7, since the object points 220P and 222P are included in all of the three candidate regions 220R, 222R and 224R, no object region may be detected in the processing up to step S210.

Therefore, as a process of the suspended candidate region, a candidate region having a center point at the nearest position from the object point may be extracted as an object region corresponding to the object point. The center points of the candidate regions 220R, 222R, and 224R are shown as center points 220C, 222C, and 224C in the figure.

Since the point nearest to the object point 220P is the center point 220C, the candidate region 220R may be selected as the object region corresponding to the object point 220P. On the other hand, since the point nearest to the object point 222P is the center point 222C, the candidate region 222R may be selected as the object region corresponding to the object point 222P.

As another example, since the candidate region 220R is selected as the object region corresponding to the object point 220P, other candidate regions 222R and 224R including the object point 220P may be deleted from the candidate region corresponding to the object point 220P. After the deletion, the object region corresponding to the object point 222P may be selected.

As still another example, a distance from each of the object points 220P, 222P to the center points 220C, 222C, 224C of the respective candidate regions may be calculated, and with the calculated distance as a score, a candidate region having the center point at which the score is the lowest may be calculated as the object region of the object point.

In addition, although the center point is used in the above to score the candidate region, embodiments of the present disclosure are not limited to this. The candidate region may be scored, for example, by using another method, such as the area of the candidate region, the existence position of the candidate region, or feature extraction of the candidate region. That is, in relation to the object point, any scoring method may be used as long as the candidate region can be appropriately selected.

As described above, according to some embodiments, when there are overlapping objects and there exist a plurality of candidate regions corresponding to object points as the existence regions of the objects, detecting how many object points exist in these candidate regions makes it possible to easily, accurately and efficiently select a region where an object exists, compared to conventional object detection methods which do not consider how many object points exist in a candidate region. For example, when there are overlapping objects as shown in FIG. 3, it is possible to appropriately link the regions where the object 208 and the object 210 exist and the object points.

As in the candidate region 224R shown in FIG. 7, a region including a plurality of objects themselves may be detected as a region where an object exists. Also in such a case, as described above, it is possible to appropriately select the object region corresponding to the object point. As described above, even in an image having a large overlap between objects, it is possible to accurately link the object point and the object region which is the existence region of the object point.

Figure 8:
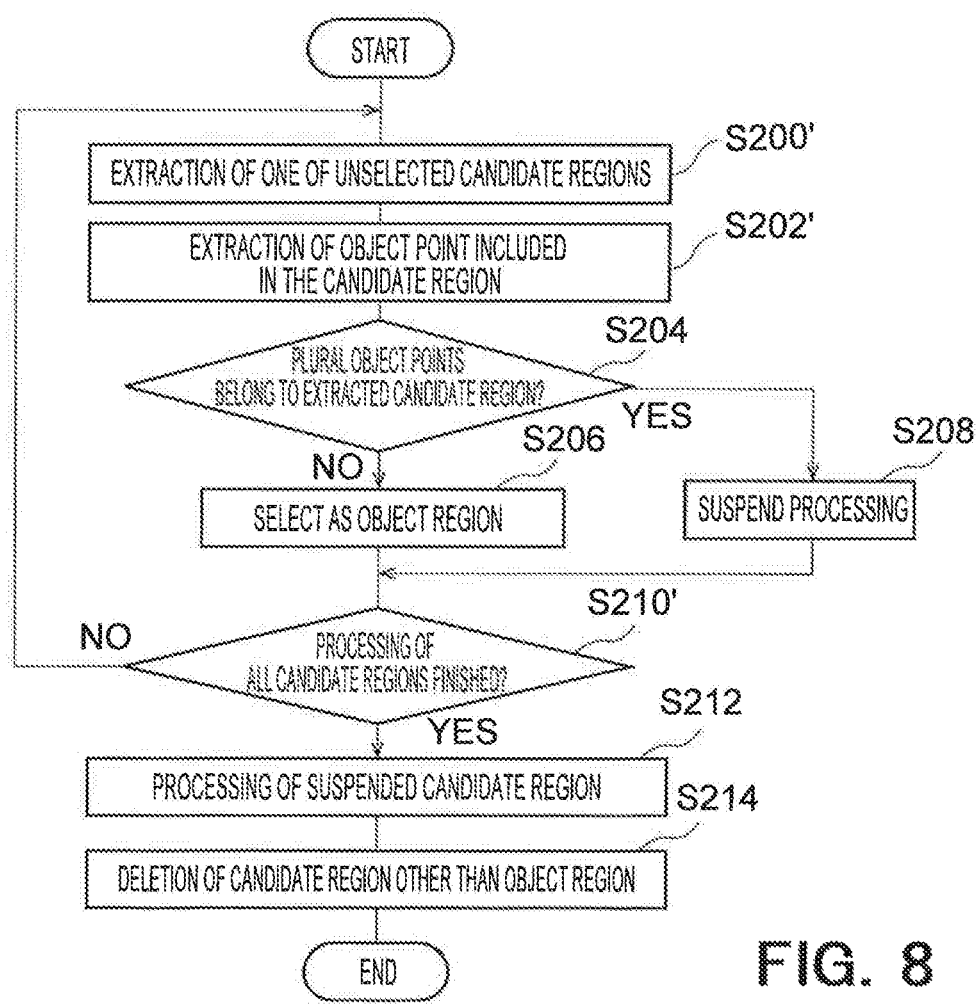
FIG. 8 is a flowchart showing a process of selecting an object region according to some embodiments.

Note that, in the above description, as shown in the flowchart of FIG. 6, an object point may be extracted and a candidate region including the object point may be extracted, but embodiments of the present disclosure are not limited to this. That is, as shown in FIG. 8, as a processing flow, a candidate region may be extracted first (in S200'), and then object points existing in the candidate region may be extracted and processed (in S202').

(Modification)

In the above-described embodiment, examples in which a marker or an IC chip is used as a method of setting an object point from an image has been described, but a method of setting an object point according to the present disclosure is not limited to these examples.

For example, when a matched filter is used in the process of detecting an object, the position of the center point of the original object can be obtained. Therefore, this center point may be used as an object point. In a case where the first model obtained in advance by learning is used, the center point of the object may be automatically set as an object point by learning or reinforcement learning with the center point of the object or the like input as training data. Furthermore, in this case, supervised learning may be performed so as to detect not a center point but a position or the like with which it is easy to recognize an object as an object point.

In the case of detecting a human, the center point of the face (for example, the position of the nose estimated from the image) may be set as the object point of the human. Also in this case, as the first model, not only a model that performs a linear operation or a correlation calculation may be generated but also a model that learns to associate an image of a human with a point (for example, the position of a nose) that is a feature of the human as training data may be generated so that the training data can be set as an object point.

Figure 9A:
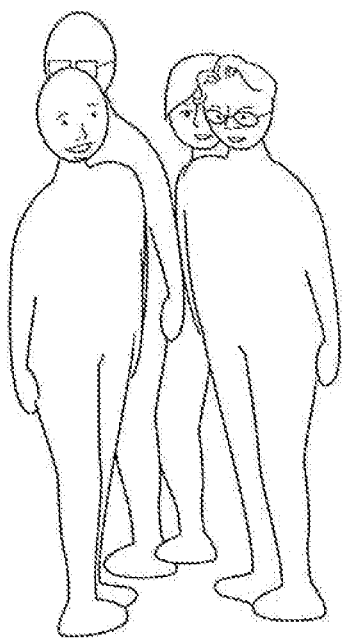
FIGS. 9A and 9B show specific examples of object detection according to some embodiments.
Figure 9B:
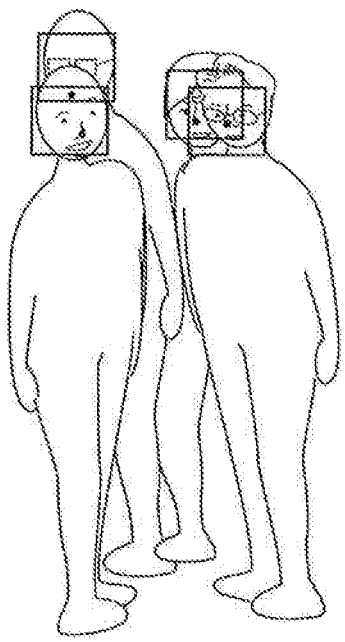

FIG. 9A is an example of a case where an image of a human is taken as an input image, and FIG. 9B is an image showing a result of human detection from the input image. As an example, the position of the nose may be estimated and set as an object point.

As described above, according to some embodiments, it is possible to accurately and efficiently detect the position of the face even among overlapped humans by considering how many object points exist in a candidate region. In addition, embodiments of the present disclosure are not limited to only the face as an object region. Instead, mixed output may be performed so that, for the human whose whole body is photographed, the whole body may be output as a region where the human exists, and for the human whose only face is photographed, a region where the face exists may be output.

For example, referring to FIG. 9B, two humans on the right have a large overlap of the regions where they are photographed, and even if a rear human is detected as a region, because the region has a large overlap with the region of the front human in the region where they are photographed, with a method of comparison with a size of the overlap, it may be determined that only one front human exists. However, according to some embodiments of the present disclosure, it is possible to perform detection with high accuracy and high efficiency irrespective of the size of the overlap of the regions. The same is true for the two humans on the left in FIG. 9B.

Particularly in the case of taking a bird's-eye view like a surveillance camera, the humans photographed in the distance often overlap their faces. Also in such a case, according to the object detection device 1 (see FIG. 1) according to some embodiments, it is possible to appropriately detect the face of a human.

In the above-described entire description, at least a part of the object detection device 1 may be configured by hardware, or may be configured by software and a CPU and the like perform the operation based on information processing of the software. When it is configured by the software, a program which achieves the object detection device 1 and at least a partial function thereof may be stored in a storage medium such as a flexible disk or a CD-ROM, and executed by making a computer read it. The storage medium is not limited to a detachable one such as a magnetic disk or an optical disk, but it may be a fixed-type storage medium such as a hard disk device or a memory. That is, the information processing by the software may be concretely implemented by using a hardware resource. Furthermore, the processing by the software may be implemented by the circuitry of a FPGA or the like and executed by the hardware. The generation of a learning model or processing after an input in the learning model may be performed by using, for example, an accelerator such as a GPU. Processing by the hardware and/or the software may be implemented by one or a plurality of processing circuitries representing CPU, GPU, and so on and executed by this processing circuitry. That is, the object detection device 1 according to this embodiment may include a memory that stores necessary information of data, a program, and the like, one or more processing circuitry that execute a part or all of the above-described processing, and an interface for communicating with the exterior.

Further, the data estimation model according to some embodiments can be used as a program module which is a part of artificial intelligence software. That is, the CPU of the computer operates so as to perform computation based on the model stored in the storage part and output the result.

The image input and output in the above-described embodiment may be a grayscale image or a color image. In the case of a color image, any color space, such as RGB or XYZ, may be used for its expression as long as colors can be properly expressed. In addition, the format of the input image data may be any format, such as raw data, a PNG format, or the like, as long as the image can be properly expressed.

A person skilled in the art may come up with addition, effects or various kinds of modifications of embodiments of the present disclosure, but examples of the present disclosure are not limited to the above-described individual embodiments. Various kinds of addition, changes and partial deletion can be made within a range that does not depart from the conceptual idea and the gist of the present invention derived from the contents stipulated in claims and equivalents thereof.

The invention claimed is:

1. A device, comprising:
one or more memories; and
one or more processing circuitries configured to:
set a first object point indicating a position of a first object in image data;
detect a first candidate region that is a candidate for an object region where the first object in the image data exists, wherein the detecting the first candidate region and the setting the first object point are performed independently from each other; and
extract the object region based on the first object point and the detected first candidate region.

2. The device according to claim 1, wherein the one or more processing circuitries are further configured to set the first object point based on a first model that has been previously learned.

3. The device according to claim 2, wherein the one or more processing circuitries are further configured to detect the first candidate region based on a second model that has been previously learned and is different form the first model.

4. The device according to claim 1, wherein the one or more processing circuitries are further configured to:
determine the detected first candidate region based on a position of the first object point; and,
wherein the extracting the object region is based on the determined first candidate region.

5. The device according to claim 4, wherein the one or more processing circuitries are further configured to:
detect a plurality of candidate regions including the first candidate region; and
the determining includes selecting the first candidate region among the plurality of candidate regions based on the position of the first object point.

6. The device according to claim 4, wherein the one or more processing circuitries are further configured to:
detect that the first candidate region has a plurality of object points; and
the determining includes selecting the first candidate region when the first candidate region does not have object points other than the first object point.

7. The device according to claim 4, wherein the determining the detected first candidate region includes when a plurality of candidate regions having an identical object point are detected, selecting a candidate region from among the plurality of candidate region as the first candidate region and deleting other candidate regions other than the first candidate region.

8. The device according to claim 4, wherein when the first candidate region has the first object point and has a second object point different from the first object point, the one or more processing circuitries are further configured to suspend selection of the first candidate region and execute selection of a candidate region other than the first candidate region.

9. The device according to claim 8, wherein after completing selection of a candidate region other than suspended candidate regions whose selection has been suspended, the one or more processing circuitries are further configured to select a candidate region that satisfies a predetermined condition, from among the suspended candidate regions.

10. The device according to claim 4, wherein
the extracting the object region includes selecting the detected first candidate region as the object region.

11. A method comprising:
setting, by one or more processing circuitries, a first object point indicating a position of a first object in image data;
detecting, by the one or more processing circuitries, a first candidate region that is a candidate for an object region where the first object in the image data exists, wherein the detecting the first candidate region and the setting the first object point are performed independently from each other; and
extracting, by the one or more processing circuitries, the object region based on the detected first candidate region and the first object point.

12. The method according to claim 11, further comprising:
determining, by the one or more processing circuitries, the detected first candidate region based on a position of the first object point,
wherein the extracting the object region is based on the determined first candidate region.

13. The method according to claim 12, wherein the determining the detected first candidate region includes:
selecting the first candidate region when the first object point belongs to the first candidate region.

14. The object detection method according to claim 12, further comprising:
the determining the detected first candidate region includes, when a plurality of candidate regions having an identical object point are detected, selecting a candidate region from among the plurality of candidate region as the first candidate region and deleting other candidate regions other than the first candidate region.

15. The method according to claim 12,
wherein the determining the detected first candidate region includes, when the first candidate region has the first object point and a second object point different from the first object point, suspending selection of the first candidate region and executing selection of a candidate region other than the first candidate region.

16. The method according to claim 15, wherein the determining the detected first candidate region includes, after completing selection of a candidate region other than suspended candidate regions whose selection has been suspended selecting a candidate region that satisfies a predetermined condition, from among the suspended candidate regions.

17. The method according to claim 12, wherein the setting the first object point is based on a first model that has been previously learned.

18. The object detection method according to claim 17, wherein the detecting the first candidate region is based on a second model that has been previously learned and is different from the first model.

19. The method according to claim 12, wherein the extracting the object region includes selecting the detected first candidate region as the object region.

20. A device, comprising:
one or more memories; and
one or more processing circuitries configured to:
set at least one object point indicating a position of an object in image data;
detect at least one candidate region where the object in the image data exists, wherein the detecting the at least one candidate region and the setting the at least one object point are performed independently from each other;
select, from the detected at least one candidate region, an object region having one object point; and
output the selected object region in which the object exists.

21. The device according to claim 20, wherein the one or more processing circuitries are further configured to set the at least one object point based on a pre-trained first model.

22. The device according to claim 20, wherein the one or more processing circuitries are further configured to:
set the at least one object point based on a first model that is previously learned; and
detect the at least one candidate region based on a second model that is previously learned and is different form the first model.

* * * * *